No. 780,461. PATENTED JAN. 17, 1905.
P. S. TRUXAL.
HORSE DETACHER.
APPLICATION FILED JULY 14, 1904.
2 SHEETS—SHEET 1.
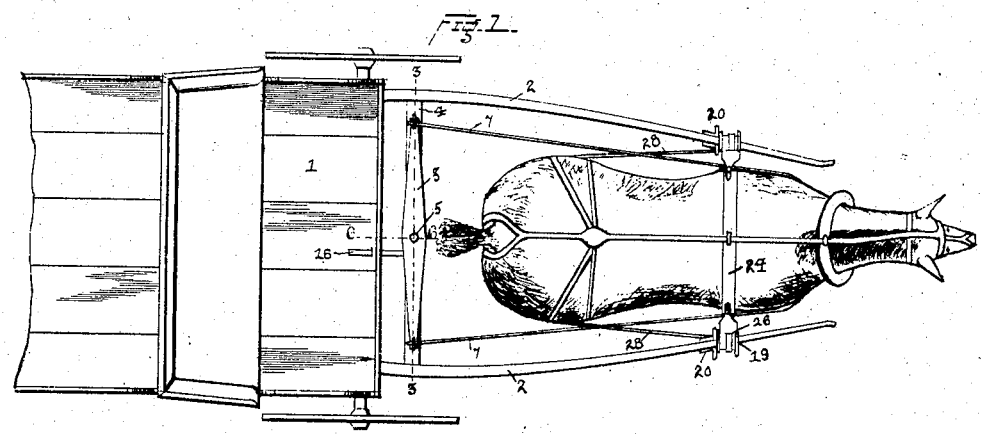
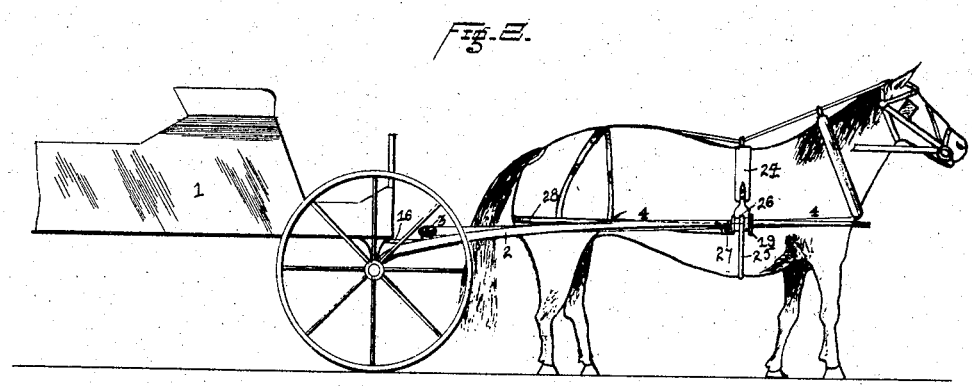
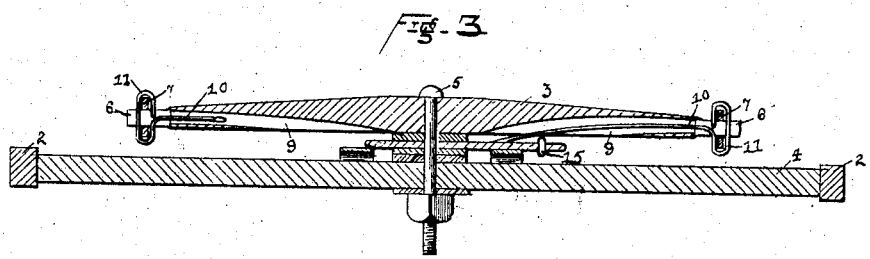
Witnesses
Forrest E. Smith
C. H. Grusbauer
Inventor
P. S. Truxal
by H. B. Willson
Attorney No. 780,461. PATENTED JAN. 17, 1905.
P. S. TRUXAL.
HORSE DETACHER.
APPLICATION FILED JULY 14, 1904.
2 SHEETS—SHEET 2.
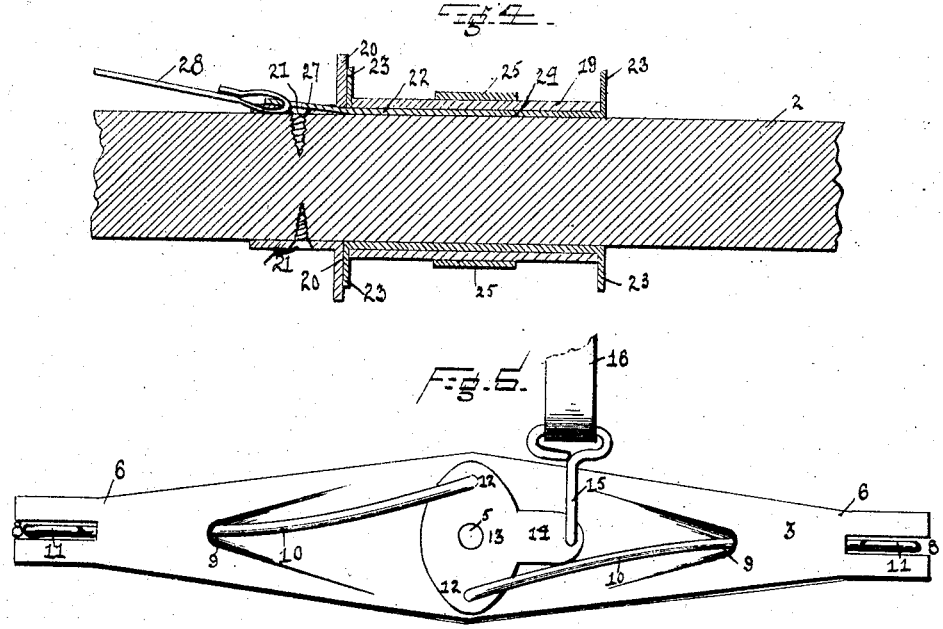
Witnesses
Inventor
P. S. Truxal
by H. B. Wilson
Attorney No. 780,461.

Patented January 17, 1905.

UNITED STATES PATENT OFFICE.

PAUL S. TRUXAL, OF HUNKER STATION, PENNSYLVANIA, ASSIGNOR OF ONE-HALF TO JOHN HUNKER, OF HUNKER STATION, PENNSYLVANIA.

HORSE-DETACHER.

SPECIFICATION forming part of Letters Patent No. 780,461, dated January 17, 1905.

Application filed July 14, 1904. Serial No. 216,596.

*To all whom it may concern:*

Be it known that I, PAUL S. TRUXAL, a citizen of the United States, residing at Hunker Station, in the county of Westmoreland and State of Pennsylvania, have invented certain new and useful Improvements in Horse-Detachers; and I do declare the following to be a full, clear, and exact description of the invention, such as will enable others skilled in the art to which it appertains to make and use the same.

My invention relates to improvements in devices for releasing or detaching a horse or other animal from the shafts of a vehicle when the animal runs away or gets beyond the control of the driver.

The object of my invention is to improve and simplify the construction and operation of devices of this character, and thereby render them more durable and efficient in use and less expensive of manufacture.

With these and other objects in view the invention consists of certain novel features of construction, combination, and arrangement of parts, as will be hereinafter more fully described, and particularly pointed out in the appended claims.

In the accompanying drawings, Figure 1 is a top plan view of a portion of a vehicle, illustrating the application of my invention thereto. Fig. 2 is a side elevation of the same. Fig. 3 is a detail vertical sectional view taken on the line 3 3 of Fig. 1. Fig. 4 is a detail horizontal sectional view taken on the line 4 4 of Fig. 2. Fig. 5 is a bottom plan of the swingletree, and Fig. 6 is a detail sectional view taken on the line 6 6 of Fig. 1.

Referring to the drawings by numeral, 1 denotes a portion of the body of a vehicle of any description, 2 the shafts of the same, and 3 the swingletree, mounted upon the cross-bar 4 of the shafts by the usual pivot-bolt 5. The ends 6 of the swingletree 3, with which the traces 7 of the harness are engaged, are slotted or recessed, as shown at 8, and are formed with longitudinally-disposed bores or passages 9, which have their outer ends opening into said recesses 8 and their inner ends opening upon the under side of the swingletree adjacent to its center. Mounted to slide longitudinally in said bores are two rods 10, which have their outer ends formed with elongated loops or eyes 11, disposed at right angles to said rods. Said loops are adapted to receive the ends of the traces 7 and to be moved into and out of the recesses 8 in the ends of the swingletree in order to retain the traces upon said ends or to disengage or detach them.

In order to operate the sliding rods, their inner ends are pivotally connected upon oppositely-projecting arms 12 of an oscillating plate 13, which is mounted upon the pivot-bolt 5 between the swingletree 3 and the cross-bar 4. Said plate 13, which is substantially triangular in form, has its third arm 14 projecting rearwardly and connected to an operating-link 15, to which one end of a cord, chain, or other suitable flexible connection 16 is attached. Said connection 16 extends upwardly through the body of the vehicle, and its free end is within convenient reach of the driver. It will be seen that when said connection is drawn upon the plate 13 will be oscillated to force the sliding rods outwardly to thus move their loops or eyes out of the recesses in the ends of the swingletree and disengage the ends of the traces from the latter. In order to retain the loops upon the ends of the sliding rods in the recesses in the ends of the swingletree, I preferably provide upon the upper side of the cross-bar 4 of the shafts a flat spring 17, which is adapted to bear upon the under side of the rearwardly-projecting operating-arm of the plate 13 to hold the same against movement, as clearly shown in Fig. 6. It will be seen that the rearwardly-projecting operating-arm of the plate 13 may project upon either side of the center of the pivot-bolt, and in order to retain said plate in either position I preferably provide a spring similar to the spring 17 upon the opposite side of the pivot-bolt 5.

In order to permit the animal to pass out from between the shafts 2 after the traces have been disconnected, I provide a detachable shaft-support and holdback connection 19, which is adapted to coact with stops 20, provided upon the shafts 3. Said stops, as shown, consist of small right-angular-shaped brackets bolted or otherwise secured, as at 21, upon the opposite sides of each of the said shafts. The device 19, as shown, comprises a sleeve 22, made, preferably, of metal and of cylindrical form and having right-angularly-projecting flanges 23 at each of its ends. The shafts 2 are adapted to project through said sleeves, which are supported from the harness of the horse or other animal by the back-strap 24, which passes around the outer sides of the said sleeves between their end flanges. The sleeves upon each side are connected together by a strap 25, which passes under the body of the animal and has each of its ends passed around the portion of the back-strap which surrounds the sleeve and through openings formed in said strap, as shown at 26. Upon the under side of the rear end of each of the sleeves is provided a rearwardly-projecting arm 27, to which the holdback-strap 28 of the harness is connected. It will be seen that when the animal holds back in coming downhill the flanges upon the rear ends of the sleeves will bear against the stop 19 upon the shafts 2 and that as soon as the traces 7 are disconnected from the swingletree and the animal moves forwardly the shafts 2 will slip out of their supporting-sleeves and the animal will be permitted to pass from between said shafts.

From the foregoing description, taken in connection with the accompanying drawings, the construction and operation of the invention will be readily understood without requiring a more extended explanation.

Various changes in form, proportion, and the minor details of construction may be resorted to without departing from the principle or sacrificing any of the advantages of this invention.

Having thus described my invention, what I claim as new, and desire to secure by Letters Patent, is—

1. In a horse-detacher, the combination with a swingletree having recessed ends, of rods mounted to slide upon said swingletree and having loops or eyes upon their outer ends adapted to receive the draft-traces and to enter said recessed ends of the swingletree in order to retain said traces upon said swingletree, and means for projecting said rods outwardly to move said loops or eyes out of said recesses and disengage said traces from said swingletree, substantially as described.

2. In a horse-detacher, the combination with a swingletree having recessed ends, of rods mounted to slide upon said swingletree and having loops or eyes upon their outer ends adapted to receive the draft-traces and to enter said recessed ends of the swingletree, an oscillatory element mounted upon the pivot of said swingletree and having said rods connected to it at oppositely-disposed points, means for holding said oscillatory element stationary to retain said loops or eyes in said recesses, and means for oscillating said element to move said loops or eyes out of said recesses, substantially as described.

3. In a horse-detacher, the combination with a swingletree having recessed ends, of rods mounted to slide upon said swingletree and having loops or eyes upon their outer ends adapted to receive the draft-traces and to enter said recessed ends of the swingletree, an oscillatory element mounted upon the pivot of said swingletree and having said rods connected to it at diametrically opposite points, a spring for holding said oscillatory element stationary to retain said loops or eyes in said recesses, and a flexible connection for oscillating said element to move said loops or eyes out of said recesses, substantially as described.

4. In a horse-detacher, the combination with a swingletree having recesses in its ends and passages or bores opening into said recesses, rods slidably mounted in said bores and having trace-receiving eyes or loops upon their outer ends adapted to be moved into and out of said recesses in said swingletree, a substantially triangular-shaped plate pivotally mounted upon the pivot-bolt of said swingletree and having two of its arms pivotally connected to the inner ends of said sliding rods, an operating connection secured to the third arm of said plate, and a spring adapted to hold said plate against movement, substantially as described.

In testimony whereof I have hereunto set my hand in presence of two subscribing witnesses.

PAUL S. TRUXAL.

Witnesses:
HARRY S. HAYS,
GEORGE W. KALP.